United States Patent
Hemmat et al.

(10) Patent No.: US 7,849,438 B1
(45) Date of Patent: Dec. 7, 2010

(54) ENTERPRISE SOFTWARE DEVELOPMENT PROCESS FOR OUTSOURCED DEVELOPERS

(75) Inventors: Merzad Hemmat, Olathe, KS (US); L. Shannon Hindman, Lees Summit, MO (US); George R. Kather, Leavenworth, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1444 days.

(21) Appl. No.: 10/857,287

(22) Filed: May 27, 2004

(51) Int. Cl.
  *G06F 9/44* (2006.01)
  *G06F 9/45* (2006.01)
(52) U.S. Cl. .................. 717/102; 717/103; 717/120
(58) Field of Classification Search ......... 717/100–103, 717/120–121, 102–108
  See application file for complete search history.

(56) References Cited

U.S. PATENT DOCUMENTS

| | | | |
|---|---|---|---|
| 5,208,765 A | 5/1993 | Turnbull | |
| 5,548,506 A | 8/1996 | Srinivasan | |
| 5,557,515 A | 9/1996 | Abbruzzese et al. | |
| 5,692,125 A | 11/1997 | Schloss et al. | |
| 5,729,746 A * | 3/1998 | Leonard | 717/101 |
| 5,758,328 A | 5/1998 | Giovannoli | |
| 5,765,140 A | 6/1998 | Knudson et al. | |
| 5,784,539 A | 7/1998 | Lenz | |
| 5,815,152 A | 9/1998 | Collier et al. | |
| 5,848,393 A | 12/1998 | Goodridge et al. | |
| 5,864,480 A | 1/1999 | Ladd | |
| 5,893,074 A | 4/1999 | Hughes et al. | |
| 5,930,798 A * | 7/1999 | Lawler et al. | 707/102 |
| 5,949,999 A * | 9/1999 | Song et al. | 717/127 |
| 5,960,200 A * | 9/1999 | Eager et al. | 717/147 |
| 5,974,392 A | 10/1999 | Endo | |
| 5,999,908 A | 12/1999 | Abelow | |
| 6,011,917 A | 1/2000 | Leymann et al. | |
| 6,289,502 B1 | 9/2001 | Garland et al. | |
| 6,324,647 B1 | 11/2001 | Bowman-Amuah | |
| 6,405,364 B1 * | 6/2002 | Bowman-Amuah | 717/101 |
| 6,424,948 B1 | 7/2002 | Dong et al. | |
| 6,505,176 B2 | 1/2003 | DeFrancesco, Jr. et al. | |
| 6,519,571 B1 | 2/2003 | Guheen et al. | |
| 6,574,605 B1 | 6/2003 | Sanders et al. | |
| 6,601,234 B1 | 7/2003 | Bowman-Amuah | |
| 6,636,585 B2 | 10/2003 | Salzberg et al. | |
| 6,658,643 B1 * | 12/2003 | Bera | 717/101 |
| 6,662,357 B1 * | 12/2003 | Bowman-Amuah | 717/120 |
| 6,671,818 B1 | 12/2003 | Mikurak | |
| 6,684,191 B1 | 1/2004 | Barnard et al. | |

(Continued)

OTHER PUBLICATIONS

Yalaho et al, "A conceptual process framework for IT supported international outsourcing of software production", IEEE BSN, pp. 1-10, 2005.*

(Continued)

*Primary Examiner*—Anil Khatri

(57) ABSTRACT

An enterprise development process for outsourced software development is provided. The process includes generating, by a business unit of an entity or organization, a concept requiring one or more computer applications, such as a project. An information technology unit of the entity may then create an integrated architecture blueprint including a design of at least a portion of the one or more computer applications. One or more outsourced suppliers of the entity, design at least a portion of the application according to the integrated architecture blueprint. The information technology unit integrates the application into a computing production environment of the entity.

17 Claims, 11 Drawing Sheets

U.S. PATENT DOCUMENTS

| | | | |
|---|---|---|---|
| 6,694,329 | B2 | 2/2004 | Murray |
| 6,721,713 | B1 | 4/2004 | Guheen et al. |
| 6,732,028 | B2 | 5/2004 | Vanstory et al. |
| 6,799,145 | B2* | 9/2004 | Kennedy et al. ............ 702/182 |
| 6,832,202 | B1 | 12/2004 | Schuyler et al. |
| 6,865,565 | B2 | 3/2005 | Rainsberger et al. |
| 6,904,593 | B1 | 6/2005 | Fong et al. |
| 6,961,687 | B1 | 11/2005 | Myers, Jr. et al. |
| 6,964,044 | B1 | 11/2005 | Hudson et al. |
| 6,973,640 | B2* | 12/2005 | Little et al. ................. 717/106 |
| 6,990,437 | B1* | 1/2006 | Abu El Ata .................... 703/2 |
| 7,047,518 | B2* | 5/2006 | Little et al. ................. 717/108 |
| 7,051,036 | B2 | 5/2006 | Rosnow et al. |
| 7,092,968 | B1* | 8/2006 | Ebel et al. ................ 707/104.1 |
| 7,101,031 | B2* | 9/2006 | Medin ........................ 347/102 |
| 7,139,999 | B2* | 11/2006 | Bowman-Amuah ......... 717/101 |
| 7,162,427 | B1* | 1/2007 | Myrick et al. .................. 705/1 |
| 7,212,987 | B2 | 5/2007 | Swanke et al. |
| 7,240,325 | B2* | 7/2007 | Keller ........................ 717/104 |
| 7,292,990 | B2* | 11/2007 | Hughes .......................... 705/9 |
| 7,321,864 | B1 | 1/2008 | Gendler |
| 7,330,822 | B1 | 2/2008 | Robson et al. |
| 7,350,185 | B2 | 3/2008 | Sparago et al. |
| 7,360,201 | B2* | 4/2008 | Srivastava ................... 717/101 |
| 7,389,217 | B2* | 6/2008 | Benny et al. .................. 703/22 |
| 7,395,540 | B2* | 7/2008 | Rogers ....................... 719/310 |
| 7,403,948 | B2 | 7/2008 | Ghoneimy et al. |
| 7,430,498 | B2 | 9/2008 | Butterfield et al. |
| 7,475,107 | B2 | 1/2009 | Maconi et al. |
| 7,487,079 | B2* | 2/2009 | Benny et al. .................. 703/22 |
| 7,490,319 | B2* | 2/2009 | Blackwell et al. ........... 717/124 |
| 7,559,049 | B1* | 7/2009 | Hemmat et al. ............. 717/102 |
| 7,631,297 | B2* | 12/2009 | Childress et al. ............ 717/120 |
| 7,640,531 | B1* | 12/2009 | Akram et al. ................ 717/101 |
| 7,653,592 | B1 | 1/2010 | Flaxman et al. |
| 7,664,664 | B2 | 2/2010 | King et al. |
| 7,685,013 | B2 | 3/2010 | Gendler |
| 7,685,604 | B2* | 3/2010 | Baartman et al. ........... 719/313 |
| 7,716,073 | B1* | 5/2010 | Martin .......................... 705/4 |
| 2002/0026630 | A1 | 2/2002 | Schmidt et al. |
| 2002/0032596 | A1 | 3/2002 | Ohsaki et al. |
| 2002/0042731 | A1 | 4/2002 | King, Jr. et al. |
| 2002/0046394 | A1 | 4/2002 | Do et al. |
| 2002/0049816 | A1 | 4/2002 | Costin, IV et al. |
| 2002/0059512 | A1 | 5/2002 | Desjardins |
| 2002/0087381 | A1 | 7/2002 | Freeman et al. |
| 2002/0147801 | A1 | 10/2002 | Gullotta et al. |
| 2003/0018952 | A1 | 1/2003 | Roetzheim |
| 2003/0023675 | A1 | 1/2003 | Ouchi et al. |
| 2003/0033191 | A1 | 2/2003 | Davies et al. |
| 2003/0055811 | A1 | 3/2003 | Stork et al. |
| 2003/0061266 | A1 | 3/2003 | Ouchi |
| 2003/0110067 | A1 | 6/2003 | Miller et al. |
| 2003/0145124 | A1 | 7/2003 | Guyan et al. |
| 2003/0171970 | A1 | 9/2003 | Kinsella |
| 2003/0181991 | A1 | 9/2003 | Chau et al. |
| 2004/0002883 | A1 | 1/2004 | Andrews et al. |
| 2004/0030421 | A1 | 2/2004 | Haley |
| 2004/0039629 | A1 | 2/2004 | Hoffman et al. |
| 2004/0098154 | A1 | 5/2004 | McCarthy |
| 2004/0111430 | A1 | 6/2004 | Hertling et al. |
| 2004/0143811 | A1 | 7/2004 | Kaelicke et al. |
| 2004/0148183 | A1 | 7/2004 | Sadiq |
| 2004/0162741 | A1 | 8/2004 | Flaxer et al. |
| 2004/0172445 | A1 | 9/2004 | Singh et al. |
| 2004/0215544 | A1 | 10/2004 | Formale et al. |
| 2005/0004825 | A1 | 1/2005 | Ehrler et al. |
| 2005/0027585 | A1 | 2/2005 | Wodtke et al. |
| 2005/0027733 | A1 | 2/2005 | Donahue |
| 2005/0114829 | A1 | 5/2005 | Robin et al. |
| 2005/0137920 | A1 | 6/2005 | O'Connor et al. |
| 2006/0031078 | A1 | 2/2006 | Pizzinger et al. |
| 2006/0047555 | A1 | 3/2006 | Kang et al. |
| 2006/0059423 | A1 | 3/2006 | Lehmann et al. |
| 2006/0106627 | A1 | 5/2006 | Al-Nujaidi |
| 2006/0173908 | A1 | 8/2006 | Browning et al. |
| 2006/0235732 | A1 | 10/2006 | Miller et al. |
| 2007/0179790 | A1 | 8/2007 | Leitch et al. |
| 2007/0276674 | A1 | 11/2007 | Hemmat |
| 2008/0319816 | A1 | 12/2008 | Benny et al. |
| 2009/0320088 | A1 | 12/2009 | Gill et al. |

OTHER PUBLICATIONS

Dossani et al, "The internet's role in offshored services: a case study of India", ACM Tras. on Internet Tech. vol. 7, no. 3, article 15, pp. 1-21, 2007.*

Unphon, "Making use of rchitecture throughout the software life cycle- How the build hierarchy can facilitate product line development", IEEE Shark, pp. 41-48, 2009.*

Babar et al, "An industrial case of exploiting product line architectures in agile software development", ACM SPLC, pp. 171-179, 2009.*

Hemmat, et al., Provisional Patent Application entitled, "Enterprise Architecture Development Process," filed Aug. 19, 2002, U.S. Appl. No. 60/404,824.

Hemmat, Merzad, Patent Application entitled, "Method for Discovering Functional and System Requirements in an Integrated Development Process," filed Aug. 18, 2003, U.S. Appl. No. 10/643,334.

Issa, Philip, et al., Patent Application entitled, "EDP Portal Cross-Process Integrated View," filed Aug. 19, 2003, U.S. Appl. No. 10/643,417.

Brandes, Tracy, et al., Patent Application entitled, "Change Request Processing in an Enterprise Development Proces," filed Aug. 19, 2003, U.S. Appl. No. 10/643,418.

Hemmat, Merzad, et al., Patent Application entitled, "Integrated Advance Scheduling of Indeterminate Projects in an Integrated Development Process," filed Dec. 8, 2003, U.S. Appl. No. 10/730,601.

Hindman, Leslie Shannon et al., Patent Application entitled, "Tool and Method for Work Authorization in an Outsourced EDP Process," filed May 2, 2005, U.S. Appl. No. 11/120,224.

"Enterprise Resource Planning (EPR) Project," University of Florida, Jan. 2003, pp. 1-25, www.bridges.ufl.edu/ implementation/teams/processes/EPR-Project-Work-Policies-draft-v6.pdf .

Issa, Philip, et al., Patent Application entitled, "Integrated Software Implementation of Enterprise Development Process," filed Aug. 19, 2003, U.S. Appl. No. 10/643,419.

Arredondo, Barbara, et al., Patent Application entitled, "Small Enhancement Process Workflow Manager," filed Jul. 14, 2005, U.S. Appl. No. 11/181,154.

Higgins, Gregory, et al., Patent Application entitled, "Multiple Conditional Pipeline Process Architecture," filed Sep. 14, 2005, U.S. Appl. No. 11/226,121.

Hemmat, Merzad, et al., Patent Application entitled, "Streamlined discover-Design Initiative," filed Jan. 19, 2005, U.S. Appl. No. 11/038,598.

Arredondo, Barbara, et al., Patent Application entitled, "System and Method for Managing Enterprise Services Projects," filed Oct. 12, 2005, U.S. Appl. No. 11/248,342.

Bray Curtis A., et al., Patent Application entitled, "Technology Assessment and Selection in Enterprise Development Process," filed Aug. 26, 2005, U.S. Appl. No. 11/213,239.

Office Action dated Dec. 1, 2005, 16 pages, U.S. Appl. No. 10/429,615, filed on May 5, 2003.

Final Office Action dated Apr. 18, 2006, 16 pages, U.S. Appl. No. 10/429,615, filed on May 5, 2003.

Office Action dated Jan. 4, 2007, 14 pages, U.S. Appl. No. 10/429,615, filed on May 5, 2003.

Final Office Action dated Sep. 10, 2007, 22 pages, U.S. Appl. No. 10/429,615, filed on May 5, 2003.

Office Action dated Dec. 27, 2007, 14 pages, U.S. Appl. No. 10/643,334, filed on Aug. 18, 2003.

Office Action (Restriction) dated Sep. 15, 2008, 7 pages, U.S. Appl. No. 10/643,334, filed on Aug. 18, 2003.
Final Office Action dated Mar. 23, 2009, 19 pages, U.S. Appl. No. 10/643,334, filed on Aug. 18, 2003.
Office Action (Restriction) dated Jul. 20, 2009, 6 pages, U.S. Appl. No. 10/643,334, filed on Aug. 18, 2003.
Office Action dated Mar. 30, 2007, 16 pages, U.S. Appl. No. 10/730,601, filed on Dec. 8, 2003.
Final Office Action dated Sep. 20, 2007, 15 pages, U.S. Appl. No. 10/730,601, filed on Dec. 8, 2003.
Advisory Action dated Dec. 27, 2007, 3 pages, U.S. Appl. No. 10/730,601, filed on Dec. 8, 2003.
Office Action dated Apr. 29, 2008, 18 pages, U.S. Appl. No. 10/730,601, filed on Dec. 8, 2003.
Final Office Action dated Oct. 28, 2008, 16 pages, U.S. Appl. No. 10/730,601, filed on Dec. 8, 2003.
Notice of Allowance dated Mar. 13, 2009, 12 pages, U.S. Appl. No. 10/730,601, filed on Dec. 8, 2003.
Office Action dated Jan. 22, 2008, 9 pages, U.S. Appl. No. 10/643,417, filed on Aug. 19, 2003.
Office Action dated Apr. 2, 2008, 17 pages, U.S. Appl. No. 10/643,417, filed on Aug. 19, 2003.
Final Office Action dated Oct. 17, 2008, 19 pages, U.S. Appl. No. 10/643,417, filed on Aug. 19, 2003.
Advisory Action dated Jan. 26, 2009, 3 pages, U.S. Appl. No. 10/643,417, filed on Aug. 19, 2003.
Office Action dated May 27, 2009, 22 pages, U.S. Appl. No. 10/643,417, filed on Aug. 19, 2003.
Office Action dated Sep. 23, 2008, 13 pages, U.S. Appl. No. 10/643,418.
Final Office Action dated Apr. 1, 2009, 14 pages, U.S. Appl. No. 10/643,418.
Advisory Action dated Jul. 7, 2009, 3 pages, U.S. Appl. No. 10/643,418.
Office Action dated Feb. 21, 2007, 22 pages, U.S. Appl. No. 10/643,419, filed on Aug. 19, 2003.
Final Office Action dated Aug. 1, 2007, 25 pages, U.S. Appl. No. 10/643,419, filed on Aug. 19, 2003.
Advisory Action dated Nov. 13, 2007, 7 pages, U.S. Appl. No. 10/643,419, filed on Aug. 19, 2003.
Notice of Abandonment dated Mar. 17, 2008, 2 pages, U.S. Appl. No. 10/643,419, filed on Aug. 19, 2003.
Office Action dated Aug. 17, 2009, 26 pages, U.S. Appl. No. 11/120,224, filed on May 2, 2005.
Office Action dated Aug. 4, 2009, 22 pages, U.S. Appl. No. 11/226,121, filed on Sep. 14, 2005.
Office Action dated Aug. 3, 2009, 28 pages, U.S. Appl. No. 11/038,598, filed on Jan. 19, 2005.
Office Action dated Aug. 18, 2008, 25 pages, U.S. Appl. No. 11/248,342, filed on Oct. 12, 2005.
Office Action dated Feb. 19, 2009, 22 pages, U.S. Appl. No. 11/248,342, filed on Oct. 12, 2005.
Final Office Action dated Sep. 3, 2009, 19 pages, U.S. Appl. No. 11/248,342, filed on Oct. 12, 2005.
Office Action dated Apr. 30, 2009, 21 pages, U.S. Appl. No. 11/213,239 filed on Aug. 12, 2005.
Notice of Panel Decision dated Oct. 13, 2009 14 pages, U.S. Appl. No. 10/429,615, filed on May 5, 2003.
Final Office Action dated Oct. 26, 2009, 30 pages, U.S. Appl. 11/213,239 filed on Aug. 12, 2005.
Office Action dated Oct. 27, 2009, 15 pages, U.S. Appl. No. 10/643,418.
Office Action dated Oct. 29, 2009, 14 pages, U.S. Appl. No. 11/181,154.
Hemmat, Merzad, *Defining and Sizing Feasible Approaches to Business Needs Within an Integrated Development Process*, Filing Date—May 05, 2003, U.S. Appl. No. 10/429,615, Specification (33 pgs.) and Drawings (3 sheets).
Advisory Action dated Nov. 17, 2009, 17 pages, U.S. Appl. No. 11/248,342, filed on Oct. 12, 2005.
Department of Defense , Systems Management College, Systems Engineering Fundamentals, Jan. 2001, Defencse Acquisition University Press, pp. 1-222.
Final Office Action dated Dec. 22, 2009, 31 pages, U.S. Appl. No. 10/643,334, filed on Aug. 18, 2003.
Office Action dated Jan. 7, 2010, 42 pages, U.S. Appl. No. 10/643,417, filed on Aug. 19, 2003.
Advisory Action dated Mar. 12, 2010, 8 pages, U.S. Appl. No. 10/643,334, filed on Aug. 18, 2003.
Final Office Action dated Mar. 30, 2010, 48 pages, U.S. Appl. No. 11/226,121, filed on Sep. 14, 2005.
Final Office Action dated Apr. 13, 2010, 49 pages,U.S. Appl. No. 10/643,418.
Advisory Action dated May 4, 2010, 3 pages, U.S. Appl. No. 11/120,224, filed on May 2, 2005.
Final Office Action dated Feb. 24, 2010, 27 pages, U.S. Appl. No. 11/120,224, filed on May 2, 2005.
Final Office Action dated May 25, 2010, 55 pages, U.S. Appl. No. 11/181,154.
Examiner's Answer dated Jun. 8, 2010, 21 pages, U.S. Appl. No. 11/248,342, filed on Oct. 12, 2005.
Upside Software, Inc., Using Upside Contract's workflow Engine to Improve Business Processes (Nov. 2004), pp. 1-2. Accessed from www.upsidesoft.com/upside+software/.../ BP%20Workflow%20FINAL%20110404.pdf.
Final Office Action dated Jun. 16, 2010, 58 pages, U.S. Appl. No. 11/038,598, filed on Jan. 19, 2005.
Pyron, Tim, "Sams Teach Yourself Microsoft® Project 2000 in 24 Hours," Safari Books Online, May 4, 2000, http://proquest.safaribooksonline.com/0-672-31814-8, 6 pages.
Office Action dated Jul. 1, 2010, 37 pages, U.S. Appl. No. 11/120,224, filed on May 2, 2005.
Office Action dated Jun. 24, 2010, 45 pages, U.S. Appl. No. 10/643,417, filed on Aug. 19, 2003.

* cited by examiner

ENTERPRISE SOFTWARE DEVELOPMENT PROCESS FOR OUTSOURCED DEVELOPERS

CROSS-REFERENCE TO RELATED APPLICATIONS

This application is contains subject-matter related to U.S. patent application Ser. No. 10/429,615, filed May 5, 2003 and entitled "Defining and Sizing Feasible Approaches to Business Needs Within an Integrated Development Process", which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the use of consistent checkpoints in the process of enterprise-wide software development to allow significant events to occur in a predictable, scheduled manner. More specifically, methods are provided that ensure that the outsourcing of software development activities is done in a consistent, efficient, and secure manner and that the outsourced development projects meet an enterprise's standards for quality.

BACKGROUND OF THE INVENTION

Many enterprises have begun to assign to outside entities work activities that were formerly performed in-house. While this outsourcing of work can be cost-effective, it can also present challenges. An enterprise would typically want to ensure that an entity to which it outsources work performs high-quality work in an efficient manner. Oversight of the outside entity would typically be maintained so that conformance to the enterprise's standards for quality, consistency, security, and other parameters is assured.

SUMMARY OF THE INVENTION

An enterprise development process for outsourced software development is provided. The enterprise development process includes generating, by a business unit of an entity, a concept requiring a computer application, and verifying an integrated architecture blueprint, by an information technology unit of the entity, including a design for at least a portion of the application. The enterprise development process also includes developing, by outsourced developers of the entity, the application according to the integrated architecture blueprint, and integrating the application developed by the outsourced developers into a computing production environment of the entity by the information technology unit.

In one embodiment, a method for developing a response to a business need which has been initially documented as a concept and approved for additional development after an initial estimate is provided. The method includes capturing functional requirements to implement the defined concept through interaction with end-users of the potentially impacted business processes and, after completion of capturing the functional requirements, capturing system requirements for potential automation and software systems supporting the impacted business processes through interaction with systems development analysts for the potentially impacted automation and software systems supporting the impacted business processes. The method includes generating an integrated architecture blueprint, by an information technology unit of a business, including a design for at least a portion of the software systems for supporting the impacted business processes, and developing, by outsourced developers of the entity, the software systems according to the integrated architecture blueprint. The method also provides for integrating, by the information technology unit, the software systems developed by the outsourced developers into a computing production environment of the business.

In yet another embodiment, a method for enterprise development of projects is provided. The method includes providing an enterprise project development system and defining a business concept associated with a business intent via the enterprise project development system. The method includes discovering the functional and system requirements related to the business concept and defining the project via the enterprise project development system. An integration portion of a design specification for the project is created by an information technology unit via the enterprise project development system. The method also provides for designing and developing, by outsourced supplier, project software based on the design specification, and testing the project software against the design specification, including planning of test activities via the enterprise project development system. The method also includes deploying, by the information technology unit, the project software in a computing production environment, including planning the deployment and implementation activities via the enterprise project development system.

DETAILED DESCRIPTION OF THE PREFERRED EMBODIMENTS

Figure 1A:
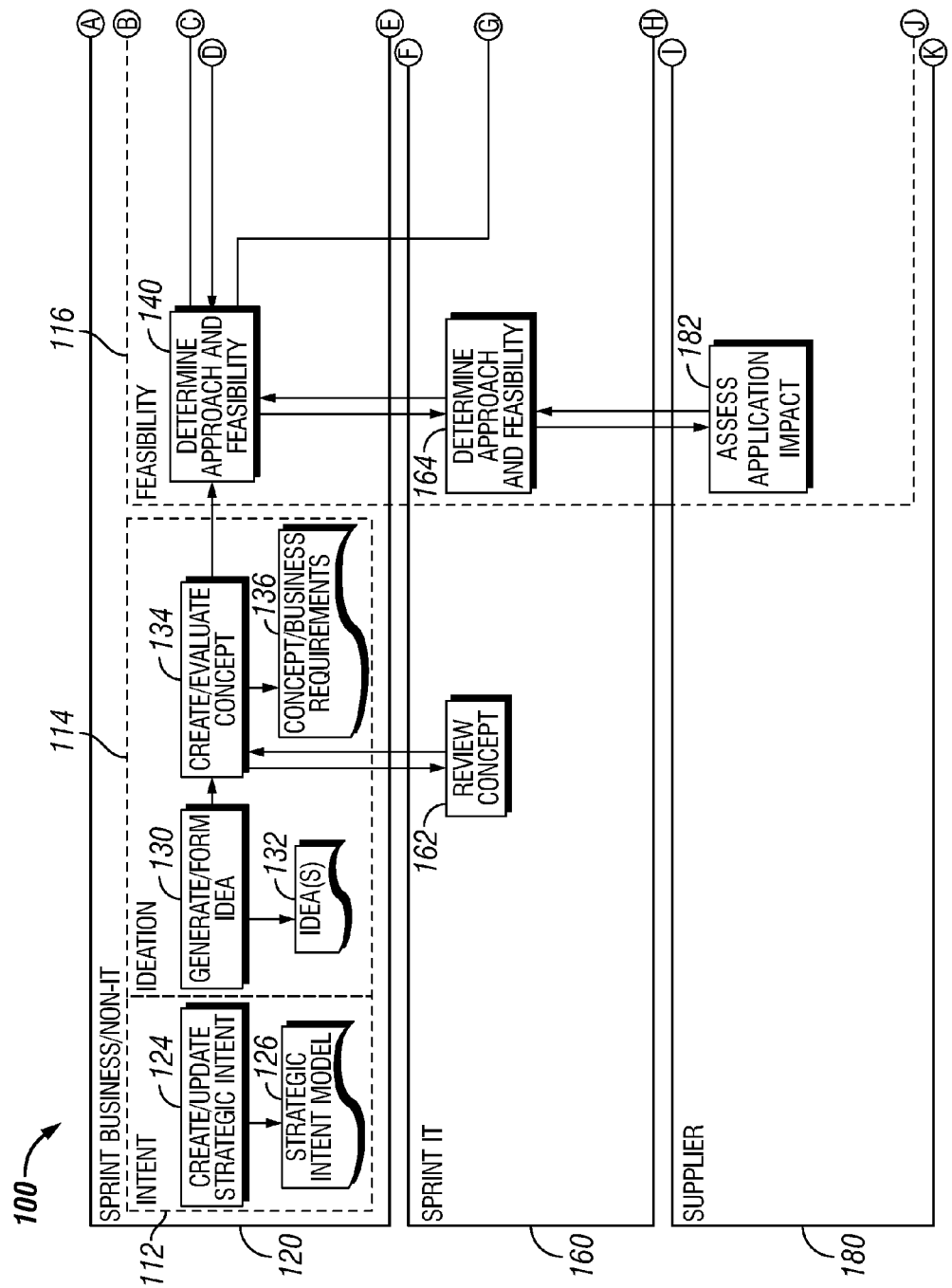
FIGS. 1A and 1B are a block diagram depicting an embodiment of the Define phase of the Enterprise Development Process.

An Enterprise Development Process (EDP) can be employed to facilitate the integration of enterprise architecture and provide rigor to the process of enterprise-wide software development. Consistent checkpoints throughout the process allow significant events to occur in a predictable, scheduled manner. A detailed description of an EDP is given in U.S. patent application Ser. No. 10/429,615, filed May 5, 2003 and entitled "Defining and Sizing Feasible Approaches to Business Needs Within an Integrated Development Process" which is incorporated herein by reference. The EDP described in that document relates to an integrated environment for defining, gathering, and disseminating project-related information where all work is performed within a single enterprise.

The present disclosure describes an EDP process where a portion of the work is performed by a service provider external to an enterprise employing the EDP. More specifically, software code development activities within the EDP are outsourced to an entity outside the enterprise. The EDP process is described in broad terms herein; more detailed descriptions of the steps in the process can be found in the patent application referenced and incorporated above.

In the embodiment of the EDP described herein, three entities are involved in carrying out the EDP. Strategic planning and a broad overview of the process are performed by a business-oriented group within the enterprise that can be referred to as the business/non-IT group. This group typically consists of management or executive level personnel who are not directly involved with technology-related activities. Coordination and oversight of technology-related activities is done by a group within the enterprise that can be referred to as the IT group. The actual software code development activities are conducted by a group outside the enterprise that can be referred to as the supplier, which may be outsourced contractors such as computer software developers. Activities performed by the supplier in this version of the EDP would have been carried out by in-house personnel in earlier versions of the EDP.

The software development activities within an enterprise can be broken down into multiple applications, where an application can be defined as a set of programs designed to perform a specific function or functions. Software development projects that involve multiple applications are broken into separate respective applications. In an embodiment, only activities within the single applications are outsourced to suppliers, although a supplier may have multiple separate applications. All integration activities are managed and retained in-house by the IT group. This allows the enterprise to maintain governance over the enterprise-wide computing architecture and to control the integration of multiple applications into large-scale projects.

In an alternative embodiment, a supplier working on several related applications may provide some integration of those applications but the IT group would still provide integration oversight.

The enterprise can implement standards that it expects suppliers to follow to ensure quality and consistency in the software code provided by the suppliers. This also promotes interchangeability among suppliers and prevents the enterprise from becoming dependent on a single supplier.

The EDP process typically comprises five phases: Define, Discover, Design, Develop, and Deploy. The Define phase encompasses processes that define the strategic intent of an enterprise and concepts that are aligned with the strategic intent. Robust concept definition and ensuing communications ensure a proposed approach is on target with what a business wants delivered. Alignment with strategic network and IT architectures is also facilitated. As a side benefit, the Define phase can reduce estimation time averages.

The Discover phase refers to the processes that help discover functional and system requirements in support of business requirements. The Discover phase facilitates a "process-driven" approach to requirements gathering. The analysis conducted in the Discover phase verifies the business processes envisioned and elicits all the requirements of the project. These requirements are documented in a centralized repository along with the business and system process models, thus enabling traceability and reuse on subsequent projects. As a by-product of the Discover phase analysis, it is possible to automatically generate interfaces as well as test workflows and test cases. These automation capabilities shorten the test window and overall project cycle time.

The Design phase deals with the processes that constitute definition of physical design specifications and that will serve as the basis for development efforts. The Design phase allows a consistent level of design detail across all development teams. This helps reduce the integration test window by enabling all development teams to develop to the correct interface specifications. Ultimately, this can result in shorter test windows and faster speed to market.

The Develop phase concerns the processes that create and test application systems and program code software according to the specifications detailed in the Design phase. The Deploy phase involves processes for planning and implementing the activities required to migrate projects, including program code, from the development environment to the production environment.

The Define phase of the EDP typically comprises four steps, Intent, Ideation, Feasibility, and Estimation. Intent refers to processes that help define the business's strategic intent through the integration of mission, goals, objective, and capability models. Business-related decisions are made at this point without consideration of feasibility or design.

The Ideation step encompasses formal and informal idea generation and the rigor of idea selection via validation against strategic intent. In the Ideation step, a problem is defined in the context of Intent and a technical approach to the problem is developed. Ideation also ensures that the definitions of concepts are aligned with the strategic intent.

The Feasibility step facilitates determination of technical approach, critical functional impacts, impacted systems, and overall feasibility of concepts prior to Estimation. Customer expectations can be managed by determining if the customer's expected delivery date is feasible. Within the Feasibility step, a concept is typically reviewed for completeness and then classified according to size, complexity, and proposed process paths.

The Estimation step facilitates estimation of level of effort (LOE) to aid with prioritization and investment decisions. An appropriate capacity of personnel, hardware, and other resources can be reserved as needed to complete a project. The Estimation step can comprise the submission of an estimation blueprint to an estimation team, an estimation of LOE drivers, and an estimation review session.

Figure 1B:
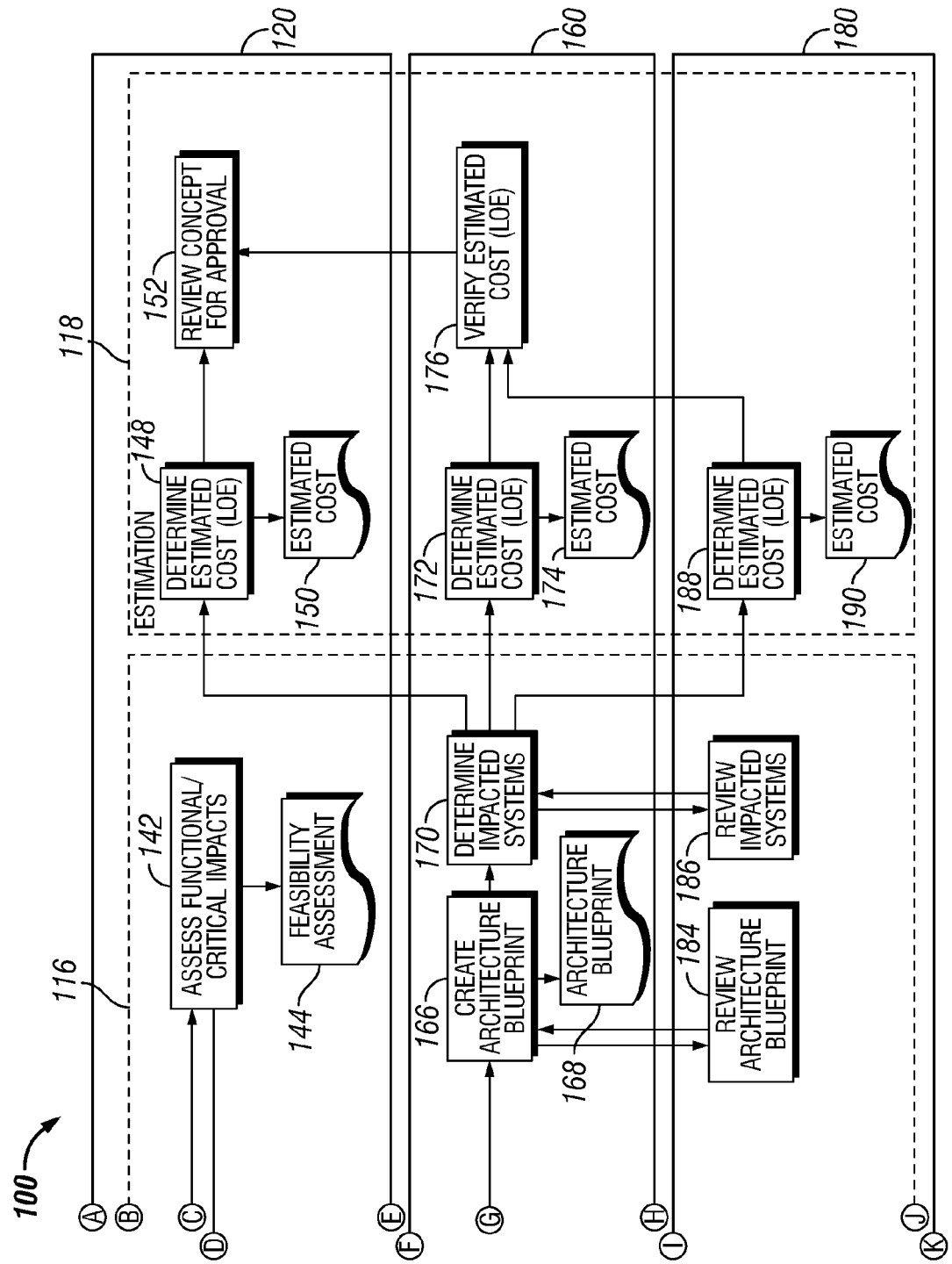

FIGS. 1A and 1B illustrate an embodiment of the Define phase 100. The Define phase 100 consists of the Intent step 112, the Ideation step 114, the Feasibility step 116, and the Estimation step 118. Three lanes of activities are shown, where lane 120 depicts activities performed by the business/non-IT group, lane 160 depicts activities performed by the IT group, and lane 180 depicts activities performed by the supplier.

The Intent step 112 within the Define phase 100 is conducted entirely by the business/non-IT group. Intent 112 consists of the business/non-IT group creating or updating a strategic intent plan in box 124. A strategic intent model 126 is the output of this step. The Intent step 112 ensures that the requirements of the business/non-IT group are well defined.

In the Ideation step 114, the business/non-IT group generates or forms an idea for a software development project in box 130 and an idea 132 is the output. For infrastructure type projects, the IT group may generate ideas, such as concepts for improvements, as well. Next, the business/non-IT group creates or evaluates a concept for a software development project in box 134, where a concept might combine and/or more strictly define one or more ideas. A set of business requirements 136 for the concept is the output.

The IT group then reviews the concept in box 162. Since the IT group will act as a liaison between the business/non-IT group and the supplier, this review is conducted to ensure that the IT group thoroughly understands the intent of the concept and that the business requirements properly reflect that intent. The IT group does not necessarily communicate the concept intent and business requirements to the supplier at this time but merely attempts to understand the intent and requirements so that the intent and requirements can be communicated at a later time if necessary. This can prevent the need for change orders later in the course of a project.

The Define process then moves to the Feasibility step 116, where the business/non-IT group determines an approach to and the feasibility of a concept in box 140. The IT group also determines an approach to and the feasibility of the concept in box 164. If necessary, the supplier can be consulted to assess the application impact in box 182. Next, the business/non-IT group assesses the functional and critical impacts of the concept in box 142. A feasibility assessment document 144 is the output of this assessment.

After the business/non-IT group and the IT group have determined the approach and feasibility in boxes 140 and 164, respectively, the IT group creates an integrated architecture blueprint in box 166, with an integrated architecture blueprint document 168 as the output. The supplier reviews the integrated architecture blueprint in box 184. Next, the IT group determines impacted systems in box 170 and the supplier reviews the impacted systems in box 186.

After the IT group completes the determination of impacted systems in box 170, the process moves to the Estimation step 118. In this step, the business/non-IT group, the IT group, and the supplier independently estimate the costs they are likely to incur in the implementation of the concept in boxes 148, 172, and 188, respectively. These estimates produce estimated cost documents 150, 174, and 190, respectively. In previous versions of the EDP where all work is done in-house, the IT group verifies its own estimates. In the present version, the IT group verifies its own cost estimates as well as those of the supplier in box 176.

The verification of a cost estimate provided by an outside entity may require a higher level of scrutiny and a greater amount of due diligence compared to the verification of an internally created cost estimate. A two-level validation process may be employed where verification at the application level is done to ensure that an application retains its function and then a verification of overall project cost is done. As a final action in the Define phase 100, the business/non-IT group reviews the concept for approval in box 152.

The Discover phase of the EDP is typically comprised of four steps, Functional Requirements Modeling (FRM), System Requirements Modeling (SRM), Application Integration Modeling (AIM), and Contract. FRM facilitates identification of functional requirements, linked to supporting business requirements. Each functional requirement typically maps to a business requirement. Typically, no IT evaluation is done at this point.

Within the FRM step, several activities can occur. First, resource planning can be conducted in which the scope of a project, the business requirements, impacted processes, a schedule, and resource assignments are detailed. Next, the functional requirements can be modeled by creating prototypes, modeling impacted functional work flows, capturing functional requirements, mapping functional requirements to business requirements, and/or capturing assumptions and issues. At this point, a comprehensive requirements document containing this information can be created and the integrated architecture blueprint produced in the Define phase can be updated. Finally, a checkpoint is conducted to verify deliverables, resolve outstanding issues, determine course of action, if necessary.

Automated solutions can be sought in the SRM step. SRM facilitates identification of system requirements, linked to supporting functional requirements. Each system requirement typically maps to a functional requirement. As with FRM, several activities can occur within the SRM step.

First, the system requirements can be modeled by creating prototypes, modeling impacted system work flows, capturing system requirements, mapping system requirements to functional requirements, and/or validating requirements against IT and network architecture. At this point, the comprehensive requirements document can be updated with the system requirements and the integrated architecture blueprint can be updated with information architecture, technical architecture, and application architecture information. Next, a checkpoint is conducted to verify deliverables, resolve outstanding issues, determine course of action, if necessary. IT personnel can then provide packages of options for approaching a problem and business-oriented personnel can choose an appropriate option.

The Application Integration Modeling (AIM) step of the Discover phase facilitates identification of inter- and intra-application approaches, with formalized focus on application interface modeling. The Contract step of the Discover phase creates visibility and accountability to an integrated view of a project (scope, schedule, and cost).

Figure 2A:
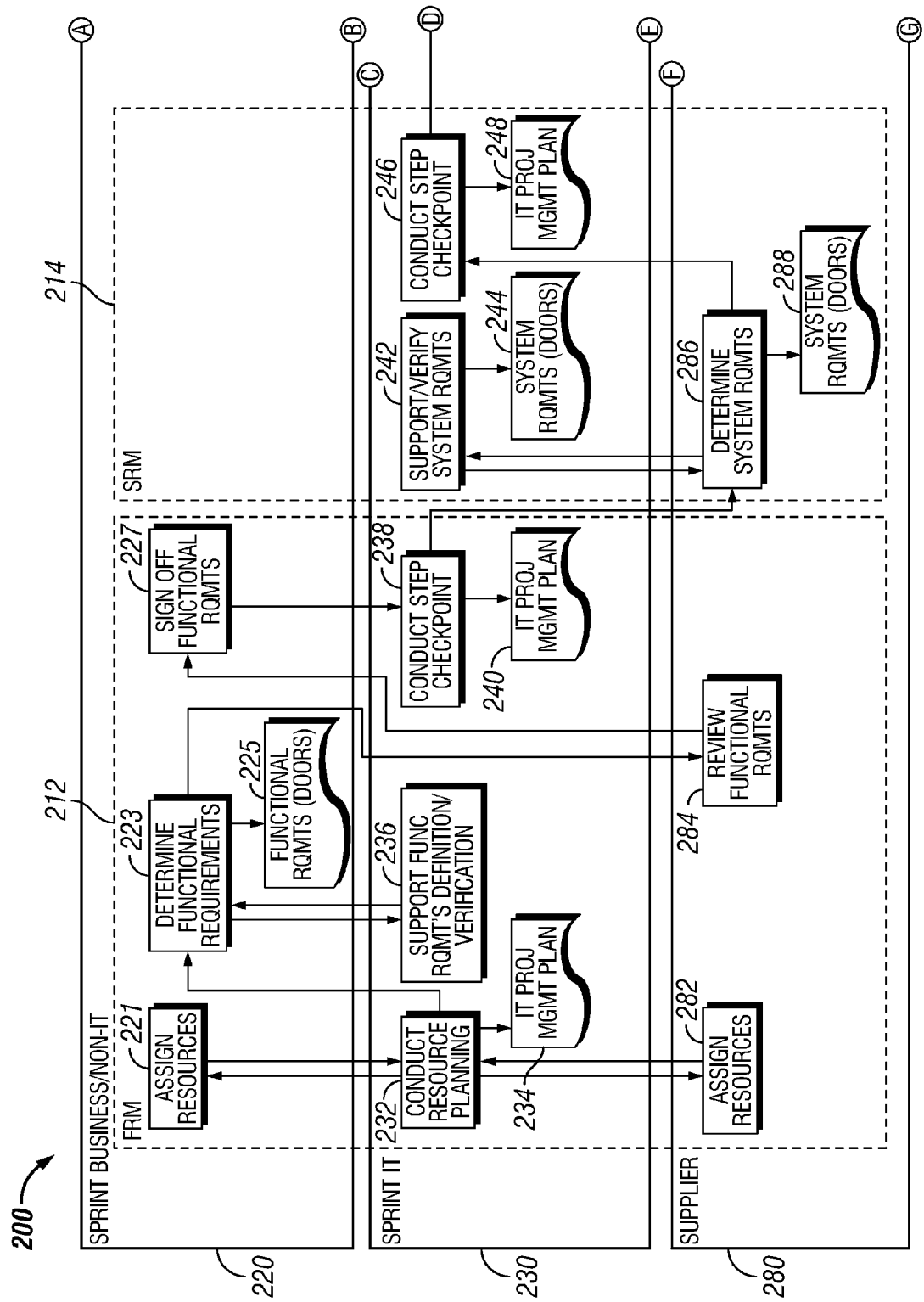
FIGS. 2A, 2B, and 2C are a block diagram depicting an embodiment of the Discover phase of the Enterprise Development Process.
Figure 2B:
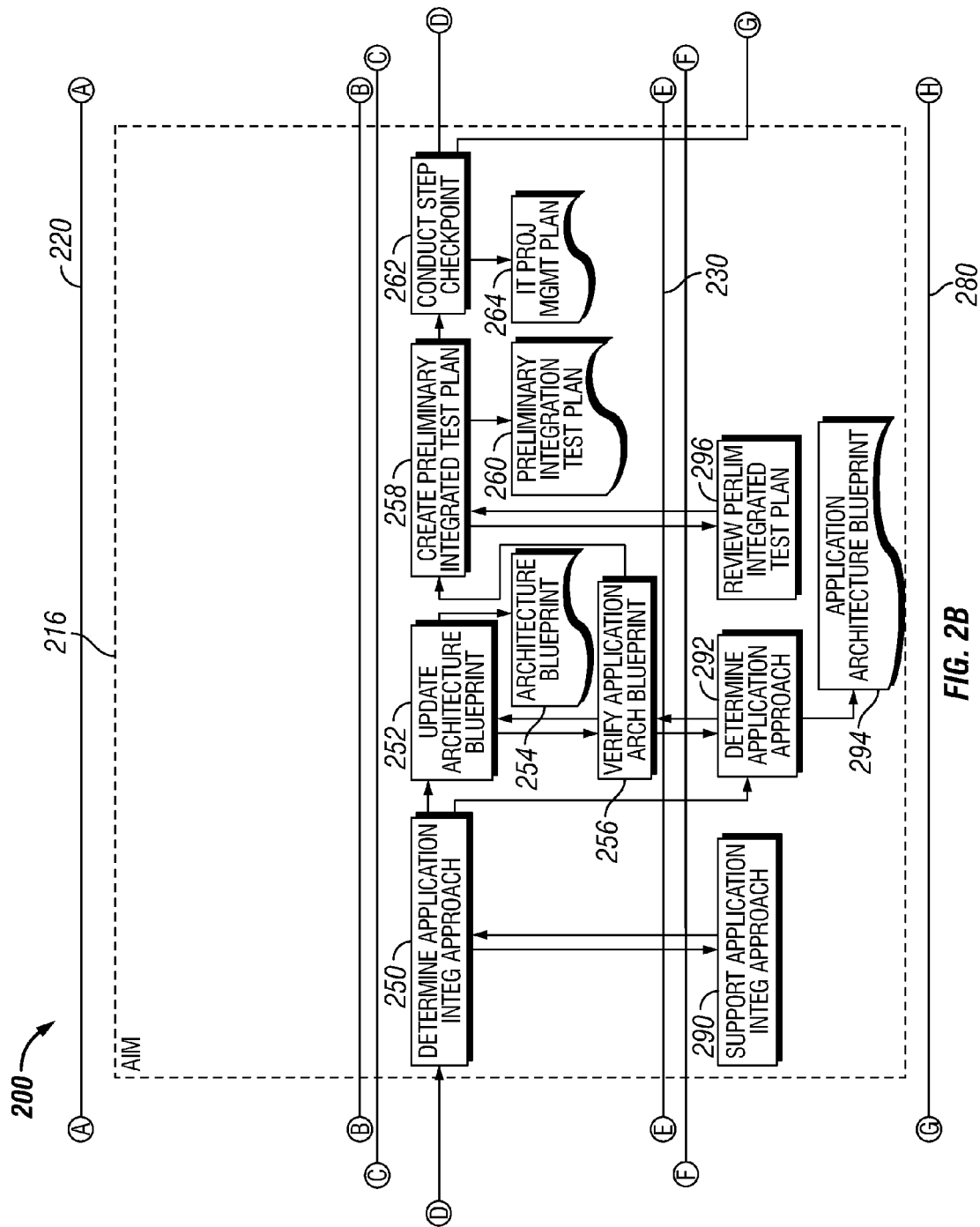
Figure 2C:
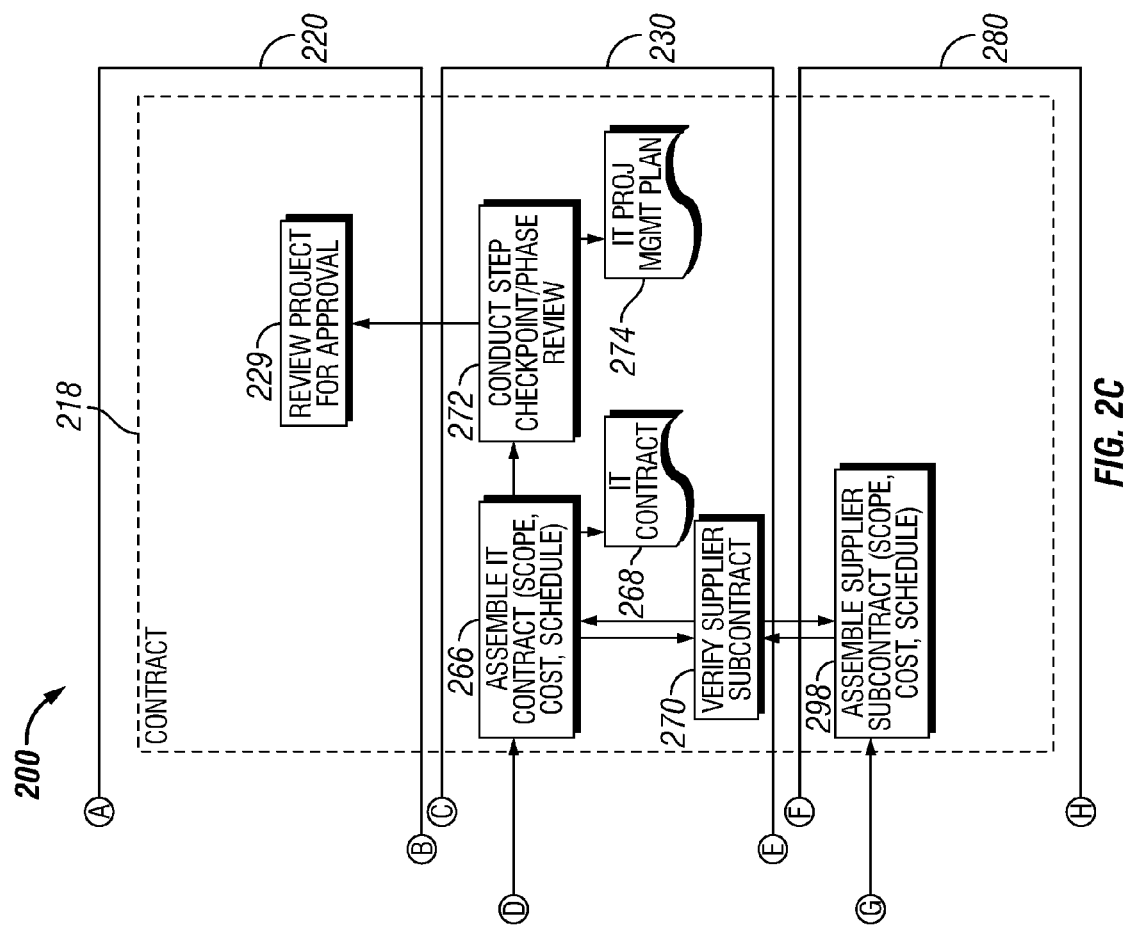

FIGS. 2A, 2B, and 2C illustrate an embodiment of the Discover phase 200 of the EDP process. The Discover phase 200 consists of the FRM step 212, the SRM step 214, the AIM step 216, and the Contract step 218. As with the Define phase, three lanes of activities are shown. One lane 220 consists of activities performed by the business/non-IT group, another lane 230 consists of activities performed by IT group, and another lane 280 consists of activities performed by the supplier.

Within the FRM step 212, the IT group conducts resource planning in box 232. This can include defining the scope of the concept such as the business requirements, the impacted processes, and the integrated architecture blueprint. Also, an approach can be discovered and a schedule can be set at this point. The business/non-IT group and the supplier then assign resources as appropriate in boxes 221 and 282, respectively. An IT project management plan document 234 is the output of this process.

The business/non-IT group determines the functional requirements for a project in box 223. This can include modeling and reviewing impacted functional workflows; capturing functional requirements such as user requirements, network and business requirements, testing requirements, and security requirements; mapping functional requirements to business requirements; capturing assumptions and issues; and demonstrating the capabilities of commercial off-the-shelf products and prototypes, if applicable.

The IT group supports and verifies the functional requirements definition in box 236. Traditionally, the determination of functional requirements would be strictly a business/non-IT group activity and the IT group would not be involved. In the version of the EDP where outsourcing is done, the IT group, while not actively defining the functional requirements, might take a more active role in supporting and verifying the functional requirements definition. This helps ensure that the IT group can accurately convey the functional requirements to the supplier and thus prevents change orders later in the course of a project. A functional requirements document 225 is the output of this process.

The supplier reviews the functional requirements in box 284. This review can take the form of a walkthrough in which the business/non-IT group, the IT group, and the supplier jointly examine the proposed functional requirements and reach an agreement on a final set of functional requirements. When an agreement is reached, the business/non-IT group signs off on the functional requirements in box 227. This sign-off serves as a formal acknowledgement of the scope of the project from the business/non-IT group that it is sponsoring the project, and that it is accountable for the functional requirements and any changes later made to them. This sign off is an attempt to minimize unnecessary and potentially costly changes to the requirements later in the development life cycle.

The IT group then reviews the actions that have been taken in the FRM step 212 by conducting a step checkpoint in box 238. The IT project management plan document 240 can be updated at this point if necessary.

In the SRM step 214, the supplier determines the system requirements in box 286. This can include modeling and reviewing impacted system workflows, capturing system requirements, mapping system requirements to functional requirements, validating requirements against IT and network architecture, and demonstrating the capabilities of commercial off-the-shelf products and prototypes, if applicable.

In box 242, the IT group supports and verifies the system requirements definitions created by the supplier. This support and verification is analogous to the support and verification that occurs in the FRM step 212. In FRM 212, it is the responsibility of the business/non-IT group to define functional requirements while the IT group provides support and verification. In SRM 214, it is the responsibility of the supplier to define system requirements while the IT group provides support and verification. In an embodiment, the same personnel within the IT group provide support and verification to both the business/non-IT group and the supplier.

Three different categories of requirements analysts can be involved in the Discover phase 200. An analyst in the business/non-IT group would deal only with functional requirements, an analyst for the supplier would deal only with system requirements, and an analyst in the IT group would deal with both functional and system requirements and act as a liaison between the business/non-IT group and the supplier.

The outputs of the system requirements definition 286 and the system requirements verification 242 are system requirements documents 288 and 244, respectively. The IT group reviews the actions that have been taken in the SRM step 214 by conducting a step checkpoint in box 246. The IT project management plan document 248 can be updated at this point if necessary.

In the AIM step 216, the IT group determines an application integration approach in box 250. That is, the IT group models the integration between the applications. The supplier supports the IT group in determining the application integration approach in box 290. The supplier then determines an application approach in box 292, with an application architecture blueprint document 294 as the output. These steps taken by the supplier are functions that were performed by the IT group in earlier versions of the EDP.

The IT group verifies the application architecture blueprint in box 256. This verification step was not performed in earlier versions of the EDP since, in those versions, the determination of an application approach was done in-house. The IT group updates the integrated architecture blueprint in box 252, with an updated integrated architecture blueprint document 254 as the output.

The IT group then creates a preliminary integrated test plan in box 258 and the supplier reviews the preliminary integrated test plan in box 296. A preliminary integrated test plan document 260 is the output. The IT group once again conducts a step checkpoint in box 262 and updates the IT project management plan document 264 if necessary.

In the Contract step 218, the IT group assembles an IT contract in box 266. The contract is an agreement between the business/non-IT group and the IT group and typically includes a scope, cost, and schedule. The supplier assembles a supplier subcontract in box 298. The supplier subcontract is an agreement between the IT group and the supplier and also typically includes a scope, cost, and schedule. The IT group verifies the supplier subcontract in box 270. The creation of a contract between the business/non-IT group and the IT group was a typical step in the earlier versions of the EDP but the creation of the subcontract between the IT group and the supplier and the verification of the subcontract were not necessary in earlier versions because all work was done in-house.

An IT contract document 268 is the output of these processes. Before a final contract is presented to the business/non-IT group for review, the cost estimates provided by the supplier in its subcontract with the IT group are aggregated with the cost estimates provided by the IT group in its contract with the business/non-IT group. The business/non-IT group is given a total estimated cost per application, as was the case in earlier versions of the EDP.

As in the previous steps, the IT group conducts a step checkpoint in box 272 and updates the IT project management plan document 274 if necessary. The business/non-IT group then reviews the project for approval in box 229.

The Design phase of the EDP process is typically comprised of two steps, Integration Design and Application Design. Integration Design defines the inter-application physical design specification that becomes a common point of reference and is binding for intra-application design. It encompasses physical information (data), environment, and security specifications.

Several activities can occur within the Integration Design step. First, resource planning can be conducted during which the scope of a project is reviewed, an approach is chosen, a schedule is created, and resource assignments are made. Next, an integration design session can be held in which inter-application design specifications, such as Interface Control Documents (ICDs), Interface Definition Language (IDL) specifications, copybooks, and environment and security specifications, are determined. An integration design document can be created as a result of this integration design session.

An integration database design can then be created, incorporating a database logical model, a database physical model, and data access mappings. The integration design document can be updated at this point if necessary. Finally, the integration design can be validated by reviewing the design's impact on other applications and resolving any major issues.

The Application Design step of the Design phase defines the intra-application physical design specification encompassing physical information (database) design. Within the Application Design step, the intra-application design specifications are determined, including the selection of user interfaces such as screen layouts, report layouts, and invoice mockups. An application design document can be created at this point.

The integration design document and the application design document together comprise a design specification that can provide the basis for the development effort. Next, an application database design can be created, incorporating a database logical model, a database physical model, and data access mappings. The application design document can be updated at this point if necessary. The application design can then be validated against the integration design document, the integrated architecture blueprint, and system requirements and capacities. Finally, a peer review can be conducted.

Figure 3A:
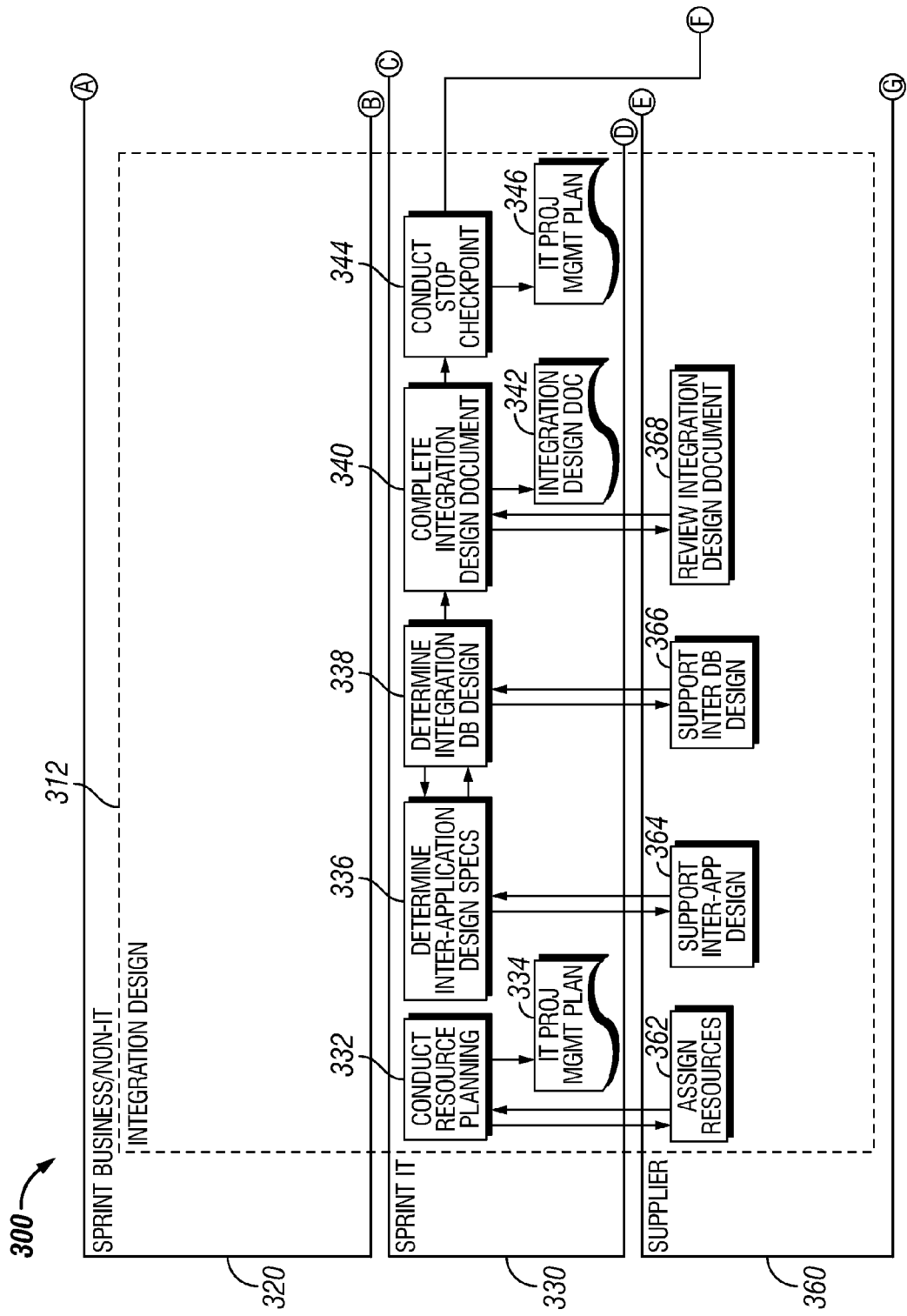
FIGS. 3A and 3B are a block diagram depicting an embodiment of the Design phase of the Enterprise Development Process.
Figure 3B:
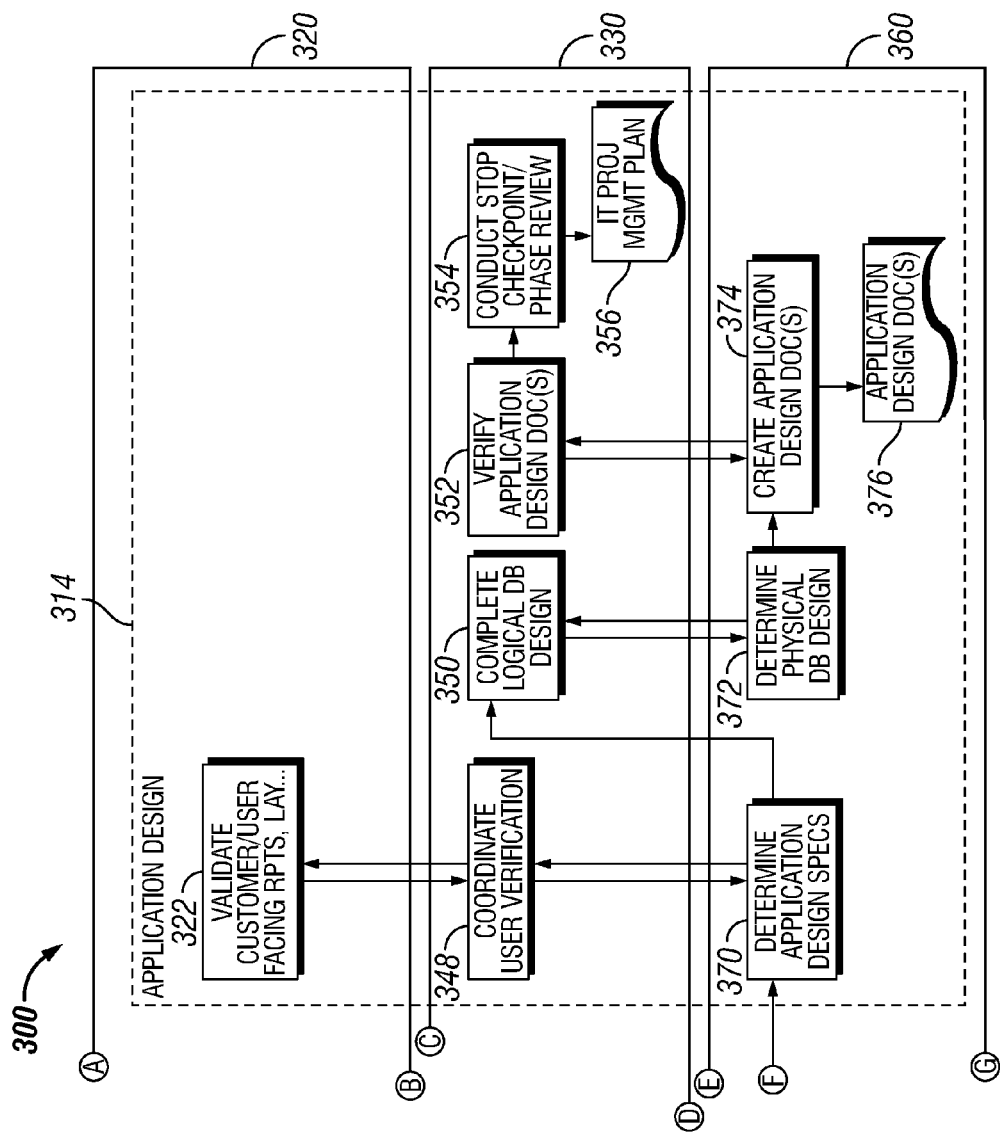

FIGS. 3A and 3B illustrate an embodiment of the Design phase 300 consisting of an Integration Design step 312 and an Application Design step 314. Again, three lanes of activities are shown, with one lane 320 consisting of activities performed by the business/non-IT group, another lane 330 consisting of activities performed by IT group, and another lane 360 consisting of activities performed by the supplier.

Within the Integration Design step 312, the IT group conducts resource planning in box 332. This can include reviewing the scope of the project, determining integration and application approaches, and setting a schedule. The supplier assigns resources to the project in box 362. An IT project management plan document 334 can be updated as a result of these processes.

Next, the IT group determines inter-application design specifications in box 336 preferably in a form of an integrated design document. This can include design specifications, database design, ICDs, IDLs, and copybooks, as applicable and becomes a binding document for all application design. The supplier supports the inter-application design in box 364. The IT group determines an integration database design in box 338 and the supplier supports the integration database design in box 366. This can include an integration database logical model, an integration database physical model, and data access mappings. The IT group completes an integration design document in box 340 and the supplier reviews the integration design document in box 368. The integration design document 342 is the output of these processes.

The IT group then reviews the actions that have been taken in the Integration Design step 312 by conducting a step checkpoint in box 344. The IT project management plan document 346 can be updated at this point if necessary. All of the actions of the supplier in the Integration Design step 312 are similar to that undertaken by the IT group in earlier versions of the EDP.

In the Application Design step 314, the supplier determines the application design specifications in box 370. This can include the selection of user interfaces such as screen layouts, report layouts, and invoice mockups as well as the design of object models and specification statements. The supplier takes the lead in this process and is the owner of the application design. The IT group does not assist the supplier in this effort and becomes involved only if the supplier needs to communicate with the business/non-IT group regarding reports, layouts, or other design matters.

In such a case, the IT group acts as a liaison between the supplier and the business/non-IT group as indicated in box 348, where the IT group coordinates user verification. This is a change from previous versions of the EDP where the IT group could communicate directly with the business/non-IT group without the need for an intermediary. The business/non-IT group validates the application design specifications in box 322.

Next, the IT group completes a logical database design in box 350 and the supplier determines a physical database design in box 372. The supplier then creates one or more application design documents in box 374 and the IT group verifies the application design documents in box 352. The verification step was not necessary in previous versions of the EDP since the design and verification were done in-house.

Application design documents 376 are the output of these processes. The IT group then reviews the actions that have been taken in the Application Design step 314 by conducting a step checkpoint in box 354. The IT project management plan document 356 can be updated at this point if necessary.

The Develop phase of the EDP typically consists of two steps, Application Code and Testing and Integrated Testing. Application Code and Testing refers to processes for creating and testing application system source code according to design specifications and IT standards. Applicable levels of testing are encompassed within the confinement of the application system (e.g., unit, string, system).

In the Application Code and Testing step, a consolidated application test plan can be formed, including plans for unit and system testing, the test environment, test data, and test automation tools. The completed plan can be recorded in an application test plan document. Code development can be performed in parallel with test planning. Code development can comprise completing a software configuration management plan, locating reusable code, creating or modifying software, validating the software against IT standards, and conducting code walkthroughs and peer reviews.

Next, unit and string testing can be done on individual applications. This can include setting up a test environment, completing a database environment, creating test data, creating contingency and backout plans, performing tests, and validating test results. System testing can then be performed on an entire system. This can again involve setting up a test environment, completing a database environment, creating test data, performing tests, and validating test results. User acceptance can be gained, if applicable. At the completion of each testing stage it may be necessary to return to the code development stage to revise the code. The revised code can then pass through the testing stages.

Integrated Testing refers to planning and execution of testing activities to ensure successful integration of application systems. Processes are performed that test the end-to-end business functionality across application systems. In the Integrated Testing step, a consolidated integration test plan can be created, including plans for inter-application connectivity testing, end-to-end testing, production-readiness testing, the test environment, test data, and automation tools. An integrated test plan document containing this information can be created.

Inter-application connectivity tests, end-to-end tests, and production readiness tests can then be performed, each involving setting up a test environment, completing a database environment, creating test data, performing tests, and validating test results. The inter-application connectivity tests deal with hardware and application connectivity. The end-to-end tests involve end-to-end business functionality, regression testing, and acceptance testing, as applicable. The production readiness tests deal with volume, stress, and performance testing.

Figure 4A:
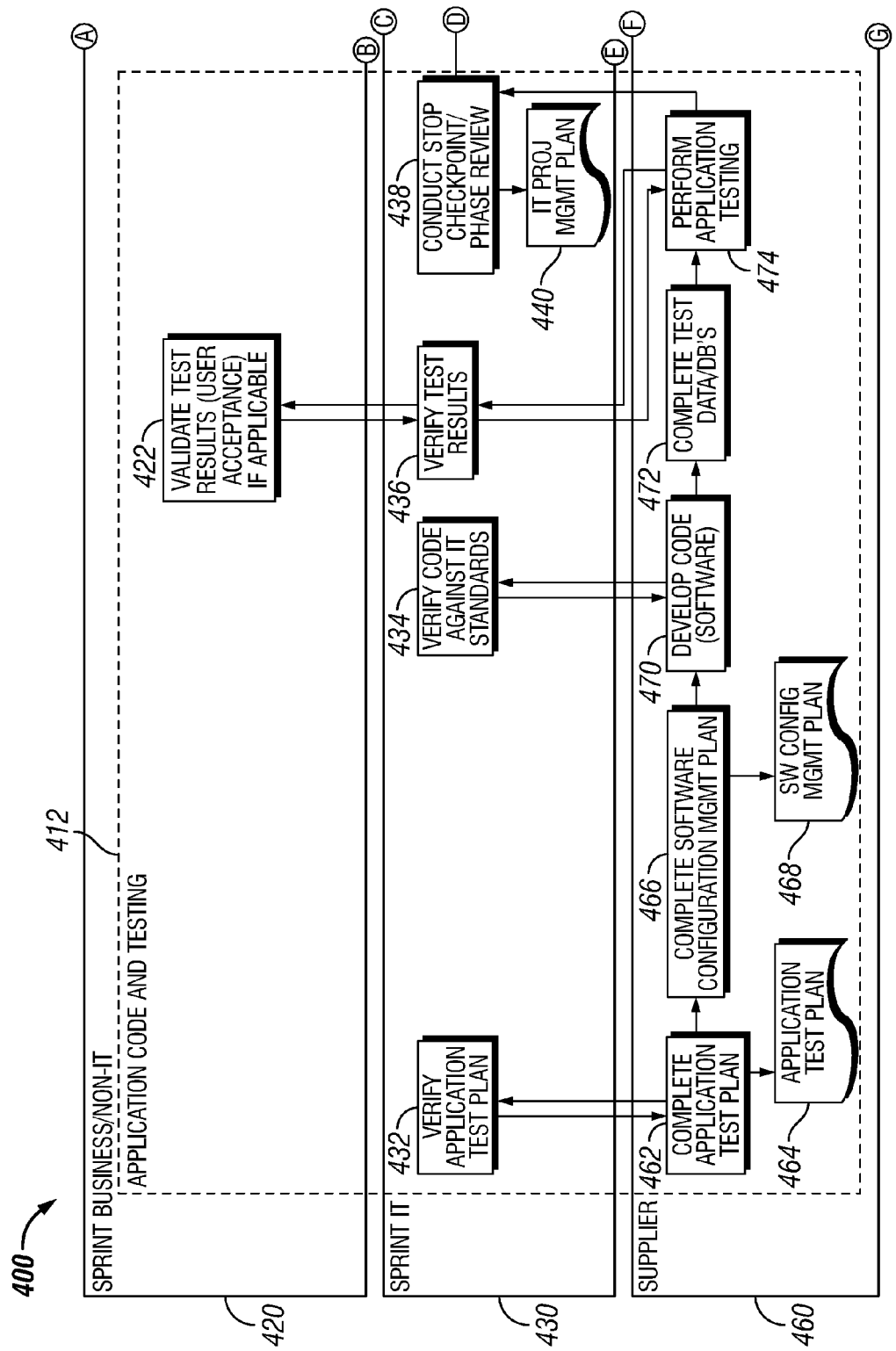
FIGS. 4A and 4B are a block diagram depicting an embodiment of the Develop phase of the Enterprise Development Process.
Figure 4B:
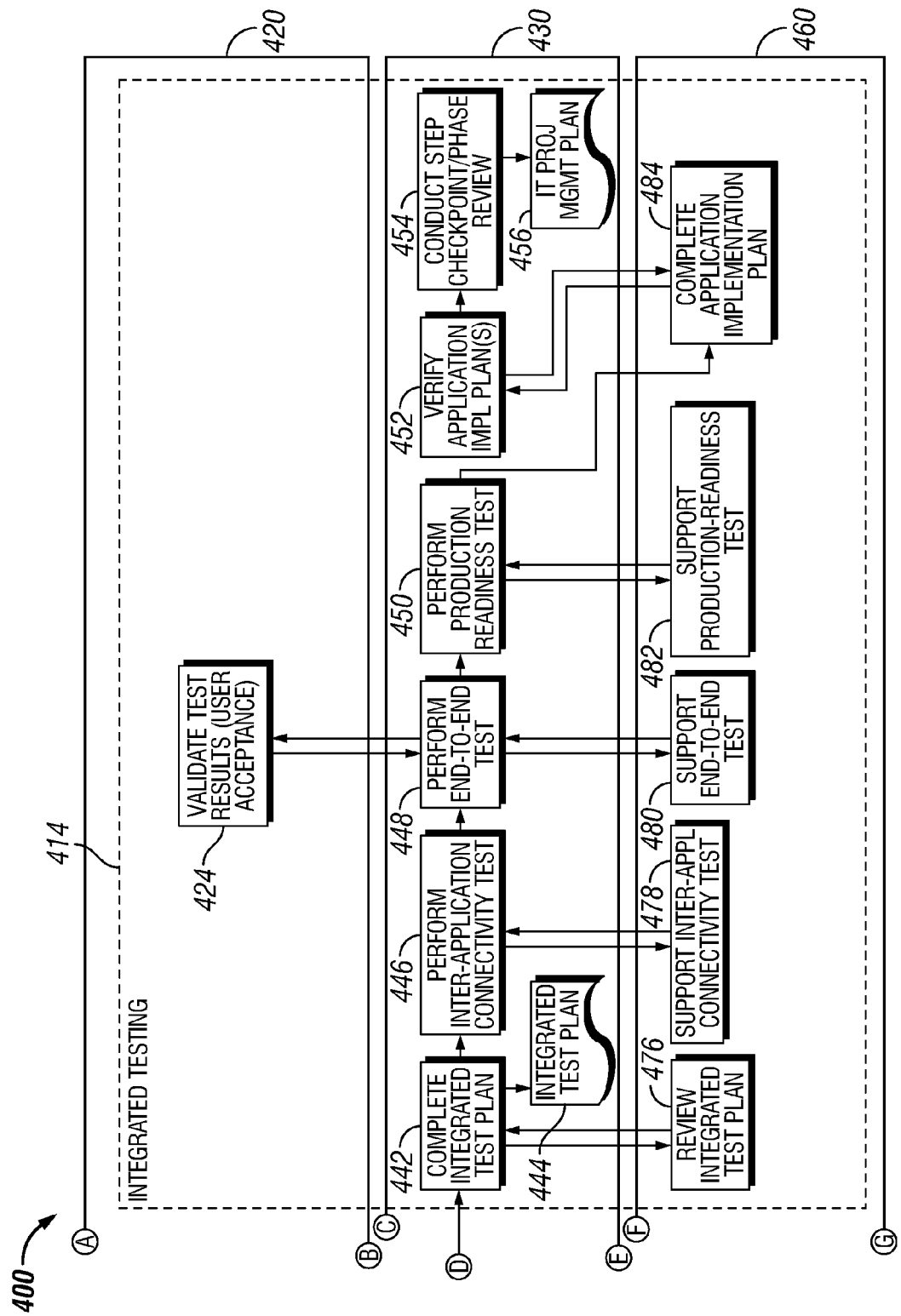

FIGS. 4A and 4B illustrate an embodiment of the Develop phase 400 of the EDP consisting of an Application Code and Testing step 412 and an Integrated Testing step 414. As with the other phases, three lanes of activities are shown. One lane 420 consists of activities performed by the business/non-IT group, another lane 430 consists of activities performed by IT group, and another lane 460 consists of activities performed by the supplier.

In the Application Code and Testing step 412, the supplier completes an application test plan in box 462. The plan can cover unit, string, and system testing, a test environment, test data, and test automation tools. The IT group verifies the application test plan in box 432. An application test plan document 464 is the output of these processes. The supplier then completes a software configuration management plan in box 466 with a software configuration management plan document 468 as the output.

The supplier then develops software code in box 470. This can include completing a software configuration management plan, locating reusable code and software components, creating or modifying code, and conducting code walk-throughs and peer reviews.

The IT group verifies the code against IT standards in box 434. The standards can be created by the IT group to ensure conformity with the enterprise's in-house principles or they can be standards that are common throughout the software development industry. The IT group would not necessarily dictate to a supplier how the supplier must code, but would merely ensure that the code meets a consistent set of standards. This facilitates the interchangeability of code provided by different suppliers, prevents the dependence of the enterprise on a single supplier, and facilitates integration in the enterprise.

In box 472, the supplier completes test data and databases and, in box 474, the supplier performs application testing. This can include setting up a test environment, completing a database environment, creating test data, performing tests, and validating test results. The IT group verifies the test results in box 436 and, if necessary, the business/non-IT group validates the test results in box 422. The IT group then reviews the actions that have been taken in the Application Code and Testing step 412 by conducting a step checkpoint in box 438. The IT project management plan document 440 can be updated at this point if necessary.

As mentioned above, in an embodiment of the EDP, a supplier develops software only for single applications. Any activities that involve integration of applications or that cross application domain boundaries are carried out by the IT group. The supplier is heavily involved in the Application Code and Testing step 412 of the Develop phase 400 since this is where the actual software code development for specific applications occurs. The IT group takes the lead in the Integration Testing step 414 of the Develop phase 400 since this is where the testing of multiple applications occurs in an integrated manner.

In the Integrated Testing step 414, the IT group completes an integrated test plan in box 442. The test plan can include plans for inter-application connectivity testing, end-to-end testing, production-readiness testing, the test environment, test data, and automation tools. The supplier reviews the integrated test plan in box 476. An integrated test plan document 444 is the output of these processes.

The IT group leads and/or coordinates inter-application connectivity tests in box 446 and the supplier supports and/or performs the inter-application connectivity tests in box 478. These involve setting up a test environment, completing a database environment, creating test data, performing hardware connectivity and application connectivity tests, and validating test results.

The IT group leads and/or coordinates end-to-end tests in box 448. The supplier supports and/or performs the end-to-end tests in box 480 and the business/non-IT group validates the test results in box 424. The end-to-end tests involve creating test data, performing end-to-end functionality tests, performing regression tests if applicable, validating test results, and gaining user acceptance.

The IT group leads and/or coordinates production readiness tests in box 450 and the supplier supports and/or performs the production readiness tests in box 482. These involve creating test data, performing volume, stress, and performance tests as applicable, validating test results, and locking code.

The supplier completes an application implementation plan in box 484 and the IT group verifies the application implementation plan in box 452. The IT group then reviews the actions that have been taken in the Integration Testing step 414 by conducting a step checkpoint/phase review in box 454. The IT project management plan document 456 can be updated at this point if necessary.

The Deploy phase of the EDP process typically encompasses two steps, Production Migration and Production Warranty. Production Migration defines the planning, execution, and verification activities required for migration from the development environment to the production (operational) environment. Within this step, a deployment plan, a deployment schedule, an environment buildout plan, and a warranty agreement can be finalized and validated with all impacted parties. This deployment plan can be recorded in a deployment plan document. The production environment set-up is typically completed at this point, including implementation of a database, user training, and documentation. Code is then migrated to the production environment and the migration is verified. Code migration can involve the IT group integrating the software systems developed by the suppliers into a computing production environment. For example, the software systems might be installed on one or more computer systems of an enterprise.

Production Warranty refers to the activities required during the transition period between deployment and on-going maintenance (also known as the warranty period) to ensure successful deployment. Support is provided during this time to resolve any production issues and facilitate transition to production support (operations). If a problem is identified in the warranty period, it is analyzed, isolated, and repaired. The repair is then verified and user acceptance is gained. The project can then be turned over to a production support group for ongoing maintenance and the project is closed out.

Figure 5A:
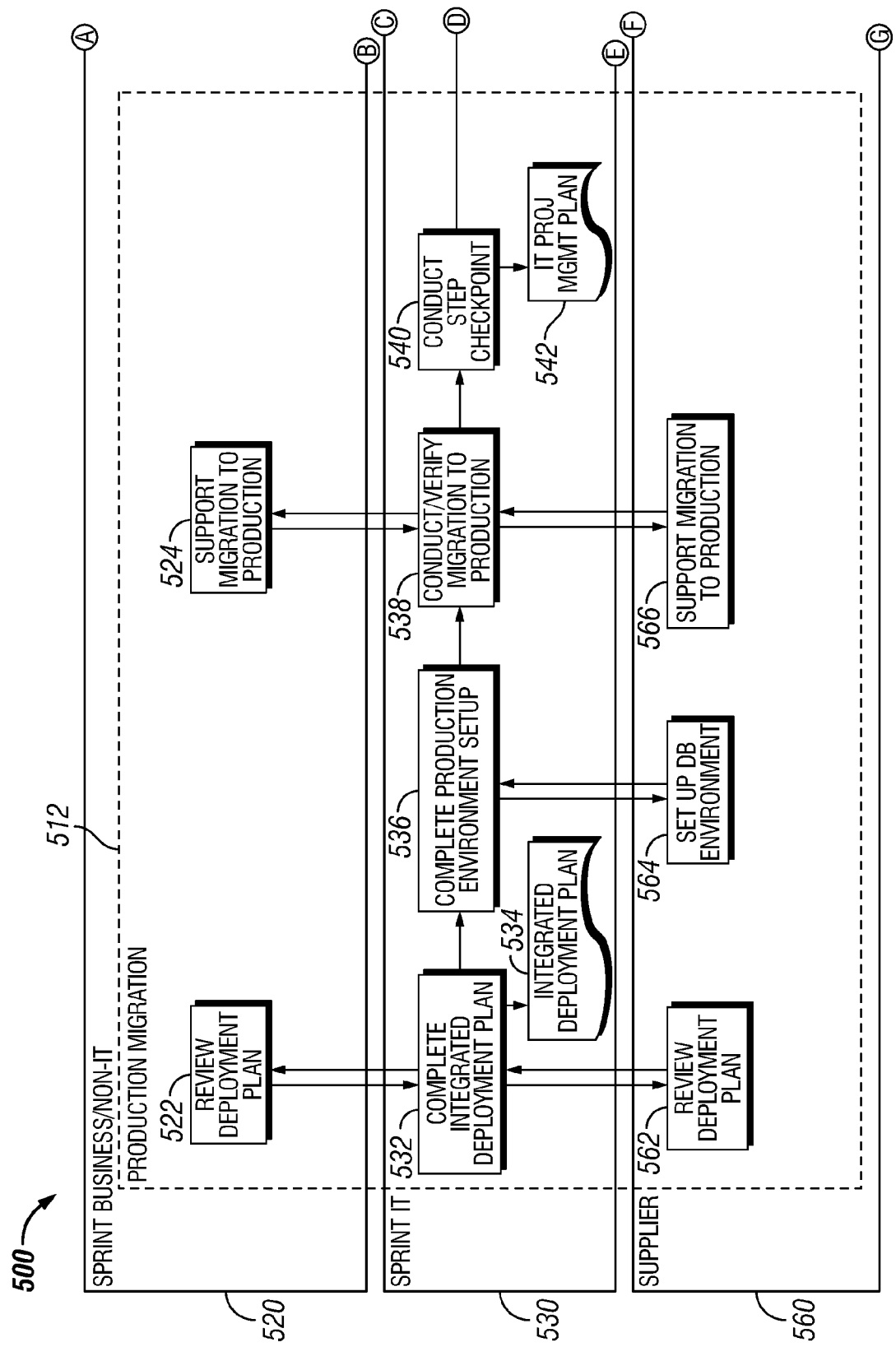
FIGS. 5A and 5B are a block diagram depicting an embodiment of the Deploy phase of the Enterprise Development Process.
Figure 5B:
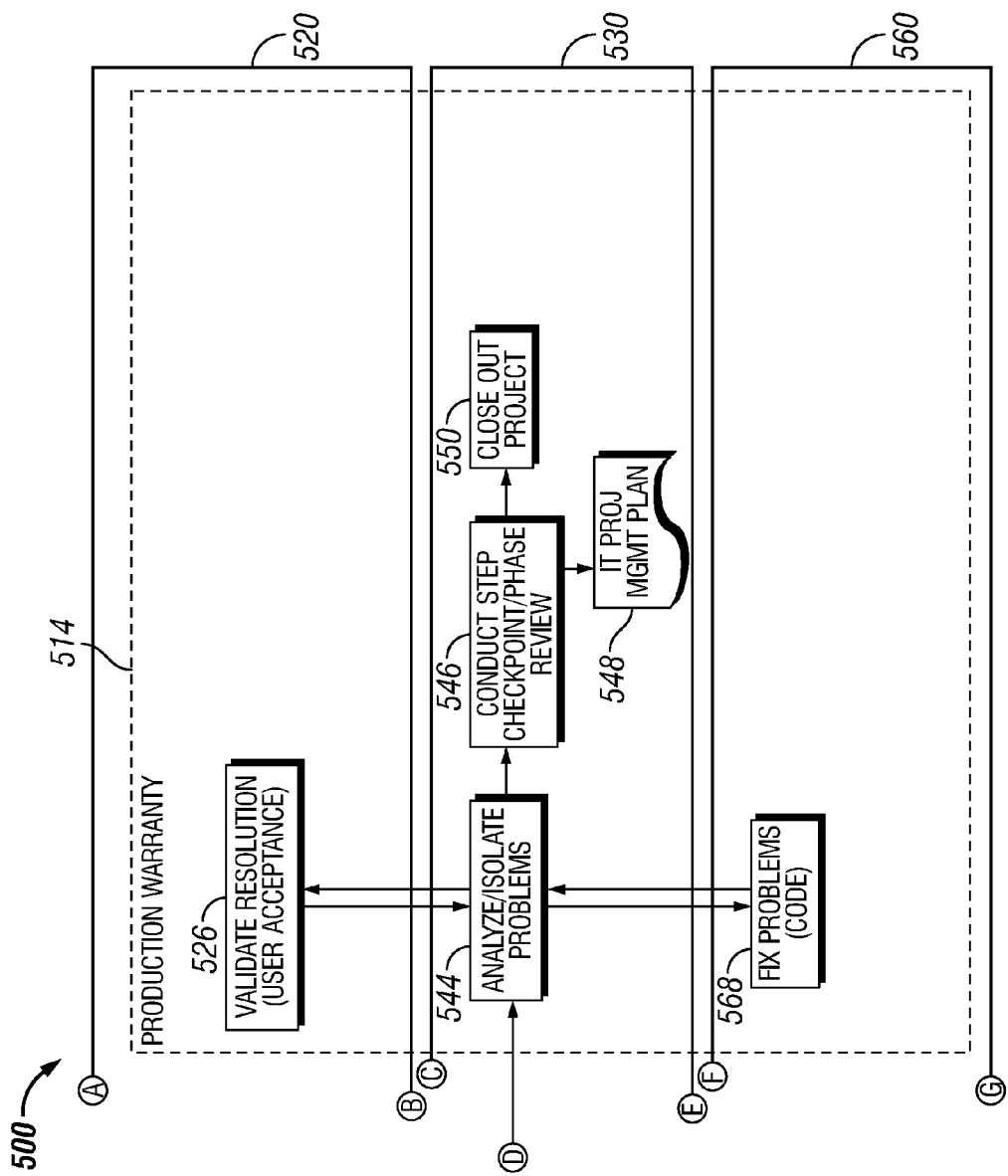

FIGS. 5A and 5B show an embodiment of the Deploy phase 500 consisting of a Production Migration step 512 and a Production Warranty step 514. Once again, three lanes of activities are shown, one lane 520 consisting of activities performed by the business/non-IT group, another lane 530 consisting of activities performed by IT group, and another lane 560 consisting of activities performed by the supplier.

In the Production Migration step 512, the IT group completes an integrated deployment plan in box 532. This can involve validating and finalizing the plan with impacted parties, setting a deployment schedule, performing an environment buildout, and reaching a warranty agreement. The business/non-IT group and the supplier review the deployment plan in boxes 522 and 562, respectively. An integrated deployment plan document 534 is the output from these processes.

The IT group completes a production environment setup in box 536 and the supplier sets up a database environment in box 564. These processes can involve verifying the environment setup, completing a database implementation, and completing user training and documentation. The database implementation might involve production data rather than test data at this point. The IT group then conducts and verifies migration of code to the production environment in box 538. The business/non-IT group and the supplier support the migration to production in boxes 524 and 566, respectively.

The IT group then reviews the actions that have been taken in the Production Migration step 512 by conducting a step checkpoint in box 540. The IT project management plan document 542 can be updated at this point if necessary.

In the Production Warranty step 514 of the Deploy phase 500, the IT group analyzes and isolates problems in box 544. The supplier fixes the problems in box 568 and the business/non-IT group validates the resolution in box 526. The IT group then reviews the actions that have been taken in the Production Warranty step 514 by conducting a step checkpoint/phase review in box 546. The IT project management plan document 548 can be updated at this point if necessary. The IT group then closes out the project in box 550.

In an embodiment, the actions described above are performed by means of an enterprise project development system that can be referred to as a Portal. The Portal is a web-based software application that supports a process-based, activity-based management model of software development by providing an organization-wide, standardized means of collecting, managing, and reporting on work flowing through the software development process. The Portal can provide a real-time, synergistic combination of a collaboration tool, a reporting interface, and a planning/execution environment.

The Portal enables all parties associated with a project to see its status and allows information about a project to be documented from its inception. The Portal can provide a common touch-point for collecting and managing project information. It can also be a vehicle for collaboratively planning, managing, and executing a project and for distributing up-to-date project information in real time, without additional post-processing or analysis. In addition, it can provide a standardized means of collecting and analyzing process performance data by acting as a data warehouse that "distills" performance information from actual activity as a project progresses through time. Project information can be entered into the Portal automatically when certain events occur or can be maintained directly by users of the tool as part of their normal job-function workflow.

The Portal can integrate itself into the work environment by becoming the primary point of contact for reporting and disseminating project status, performance, and other project information. It can provide the primary interface for project workflow at the process level. The design can incorporate a workflow model organized by process touch-points, such that process steps have "work queues" from which process data are collected or presented when a project reaches a specific step.

The Portal can be considered a series of web-based graphical user interfaces, or screens, in which project-related data can be viewed or edited. A set of screens can show the process flows for various phases of a concept or project.

A detailed description of a Portal is given in U.S. patent application Ser. No. 10/643,417, filed Aug. 19, 2003 and entitled "EDP Portal Cross-Process Integrated View" which is incorporated herein by reference.

In an embodiment of the present version of the EDP, only single applications are outsourced to a supplier, but it should be understood that in other embodiments multiple or integrated applications may be outsourced as well. However, it is not necessarily the case that all applications are outsourced. An enterprise might wish to retain some applications in-house for security reasons, to fulfill contractual obligations with other entities, or for other reasons. In such cases, the previous version of the EDP might be followed.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. An enterprise development process for outsourced software development, comprising:

generating, by using an enterprise project development system stored in a memory and executing on a computer, a concept requiring a computer application;

creating an integrated architecture blueprint including a design for at least a portion of the application using the enterprise project development system, wherein at least a portion of the application design is an integration portion of the application;

assembling one or more outsourced supplier subcontracts using the enterprise project development, wherein the one or more outsourced supplier subcontracts comprise a scope, a cost estimate, and a schedule;

verifying the one or more outsourced supplier subcontracts using the enterprise project development system;

designing at least a portion of the application according to the integrated architecture blueprint based on the one or more outsourced supplier subcontracts;

performing integration testing on the application in a computer test environment, wherein integration testing comprises at least one of creating an integration test plan, setting up the computer test environment, creating test data, performing an inter-application connectivity test, performing an end-to-end test, and performing a production readiness test; and migrating the application to a computer production environment.

2. The enterprise development process of claim 1, further comprising obtaining, by at least one enterprise employee, business requirements from a business unit for the application.

3. The enterprise development process of claim 1, further comprising:

determining an information technology group cost estimate using the enterprise project development system; and aggregating the information technology group cost estimate and the cost estimates of the outsourced supplier subcontracts to provide a total cost to a business unit of the enterprise for the application using the enterprise project development system.

4. The enterprise development process of claim 1, wherein the application is further defined as a single application.

5. The enterprise development process of claim 1, further comprising:

capturing functional requirements to implement the concept through interaction with end-users of the potentially impacted business processes, the functional requirements captured using the enterprise project development system;

after completion of capturing the functional requirements, capturing system requirements for potential automation and software systems supporting the impacted business processes through interaction with systems development analysts for the potentially impacted automation and software systems supporting the impacted business processes, the functional requirements captured using the enterprise project development system, wherein every captured system requirement is mapped to at least one captured functional requirement; and generating the architecture blueprint, by an information technology group, including a design for at least a portion of the software systems for supporting the impacted business processes, the architecture blueprint generated using the enterprise project development system.

6. The enterprise development process of claim 1, wherein Creating the integrated architecture blueprint is performed by at least one enterprise employee using the enterprise development system,
assembling one or more outsourced supplier subcontracts is performed by an outsourced supplier employee using the enterprise project development system,
verifying the one or more outsourced supplier subcontracts is performed by an enterprise employee using the enterprise project development system,
designing at least a portion of the application according to the integrated architecture blueprint based on the one or more outsourced supplier subcontracts is performed by one or more outsourced suppliers of the enterprise,
integration testing on the application is performed by an information technology group of the enterprise, and
migrating the application to a computer production environment is performed by the information technology group.

7. A method for developing a response to a business need which has been initially documented as a concept and approved for additional development after an initial estimate comprising:
identifying a set of business requirements with respect to the approved concept;
capturing functional requirements to implement the defined concept through interaction with end-users of the potentially impacted business processes, the functional requirements captured using an enterprise project development system stored in a memory and executing on a computer, wherein every captured functional requirement is mapped to at least one identified business requirement;
after completion of capturing the functional requirements, determining system requirements to implement the defined concept using the enterprise project development system by modeling and reviewing system workflows, capturing system requirements, mapping system requirements to functional requirements, and validating requirements against architecture;
verifying the system requirements using the enterprise project development system;
generating an architecture blueprint using the enterprise project development system, the architecture blueprint including a design for at least a portion of the software systems for supporting the impacted business processes, the architecture blueprint generated using the enterprise project development system and based at least in part on the system requirements;
developing the at least the portion of the software systems according to the architecture blueprint; and
performing integration testing on the software systems in a computer test environment, wherein integration testing comprises at least one of creating an integration test plan, setting up the computer test environment, creating test data, performing an inter-application connectivity test, performing an end-to-end test, and performing a production readiness test.

8. The method of claim 7 wherein every captured functional requirement is mapped to only one identified business requirement.

9. A method for enterprise development of projects, comprising:
providing an enterprise project development system, wherein the enterprise project development system is stored in a memory and executed on a computer;
defining a business concept associated with a business intent of a business via the enterprise project development system;
discovering the functional and system requirements related to the business concept defining the project via the enterprise project development system;
creating an integration portion of a design specification for the project via the enterprise project development;
creating an application architecture blueprint using the enterprise project development system;
verifying the application architecture blueprint using the enterprise project development system;
developing a project software based on the design specification and based on the application architecture blueprint;
performing application testing of the project software in a computer test environment the application testing including planning of test activities;
performing integration testing on the project software in a computer test environment wherein integration testing comprises at least one of creating an integration test plan, setting up the computer test environment, creating test data, performing an inter-application connectivity test, performing an end-to-end test, and performing a production readiness test; and
deploying the project software in a computing production environment, including planning the deployment and implementation activities via the enterprise project development system,
wherein the project software is further defined as one of a single software application and an integrated software application.

10. The method of claim 9, wherein defining the business concept further comprises:
determining an estimated cost of the project; and
determining an estimated time of the project.

11. The method of claim 10, wherein discovering the functional and system requirements further comprises:
determining a second estimated cost of the project; and
determining a second estimated time of the project.

12. The method of claim 9, wherein a portion of the design specification for the application is provided by support from outsourced developers.

13. The method of claim 9, further comprising:
obtaining, by an information technology group, a contract including an outsourced development cost estimate for the development of the application by outsourced developers;
determining an information technology group cost estimate; and
aggregating the information technology group cost estimate and the outsourced development cost estimate to provide a total cost for the application.

14. The method of claim 9, wherein an outsourced developer develops only single applications and wherein multiple integrated applications are developed by an information technology group.

15. The method of claim 9, wherein an outsourced developer designs a portion of the design specification and wherein an information technology group validates the design specification.

16. The method of claim 9, wherein the project software is further defined as a plurality of software applications, wherein one of a plurality of outsourced developers develops one of the plurality of software applications, and wherein an information technology group performs the integration testing on the plurality of software applications of the project software.

17. The method of claim 9, wherein
creating an integration portion of a design specification for the project via the enterprise project development system is performed by an information technology group of the enterprise,
creating an application architecture blueprint using the enterprise project development system is performed by outsourced developers of the business,
verifying the application architecture blueprint using the enterprise project development system is performed by the information technology group;
developing the project software is performed by the outsourced developers,
application testing of the project software is performed by the outsourced developers,
integration testing on the project software is performed by the information technology group, and
deploying the project software in a computing production environment is performed by the information technology group.

* * * * *